Nov. 23, 1943.  E. J. KARP  2,334,775
TRANSMISSION UNIT
Original Filed April 25, 1941   2 Sheets-Sheet 1
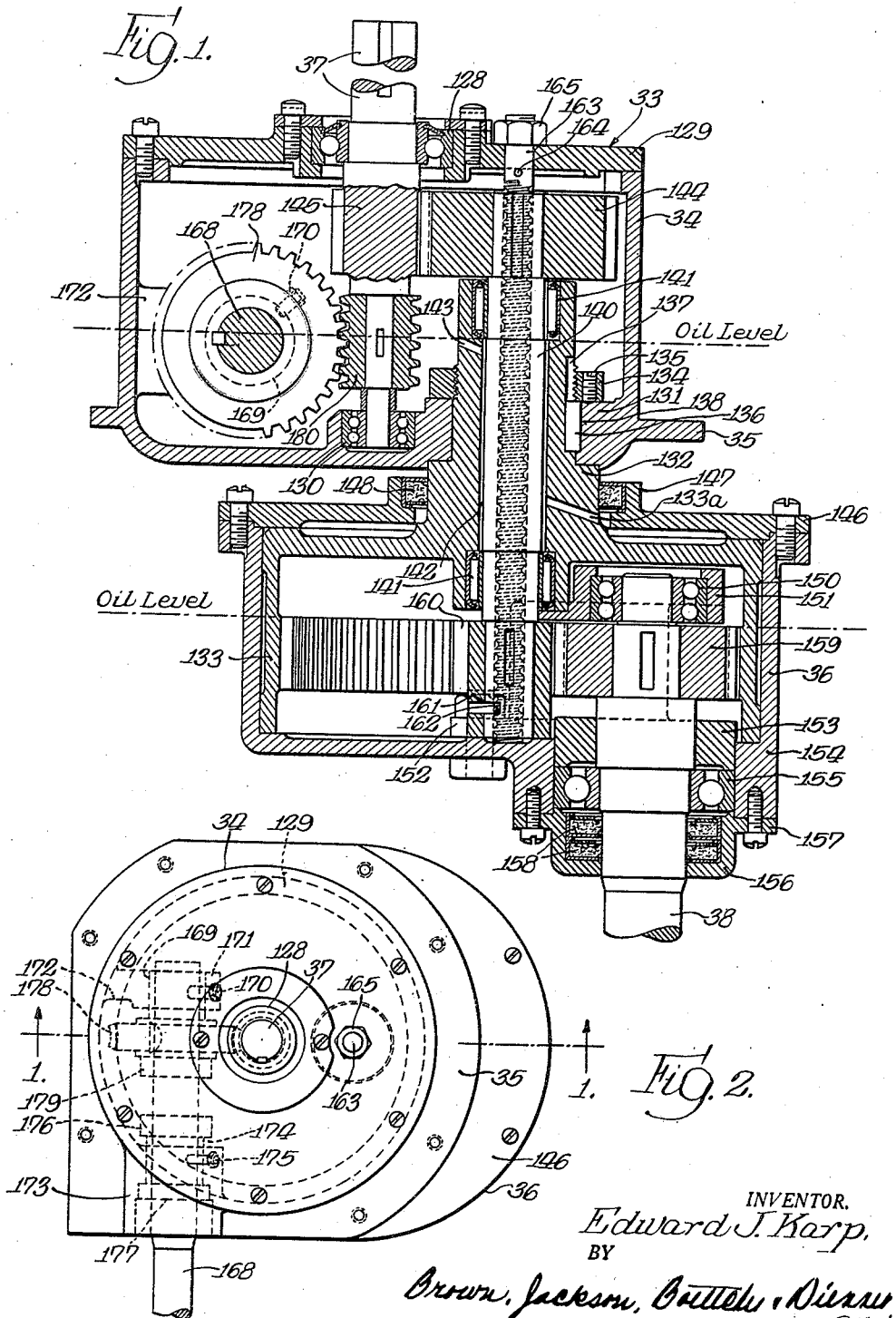

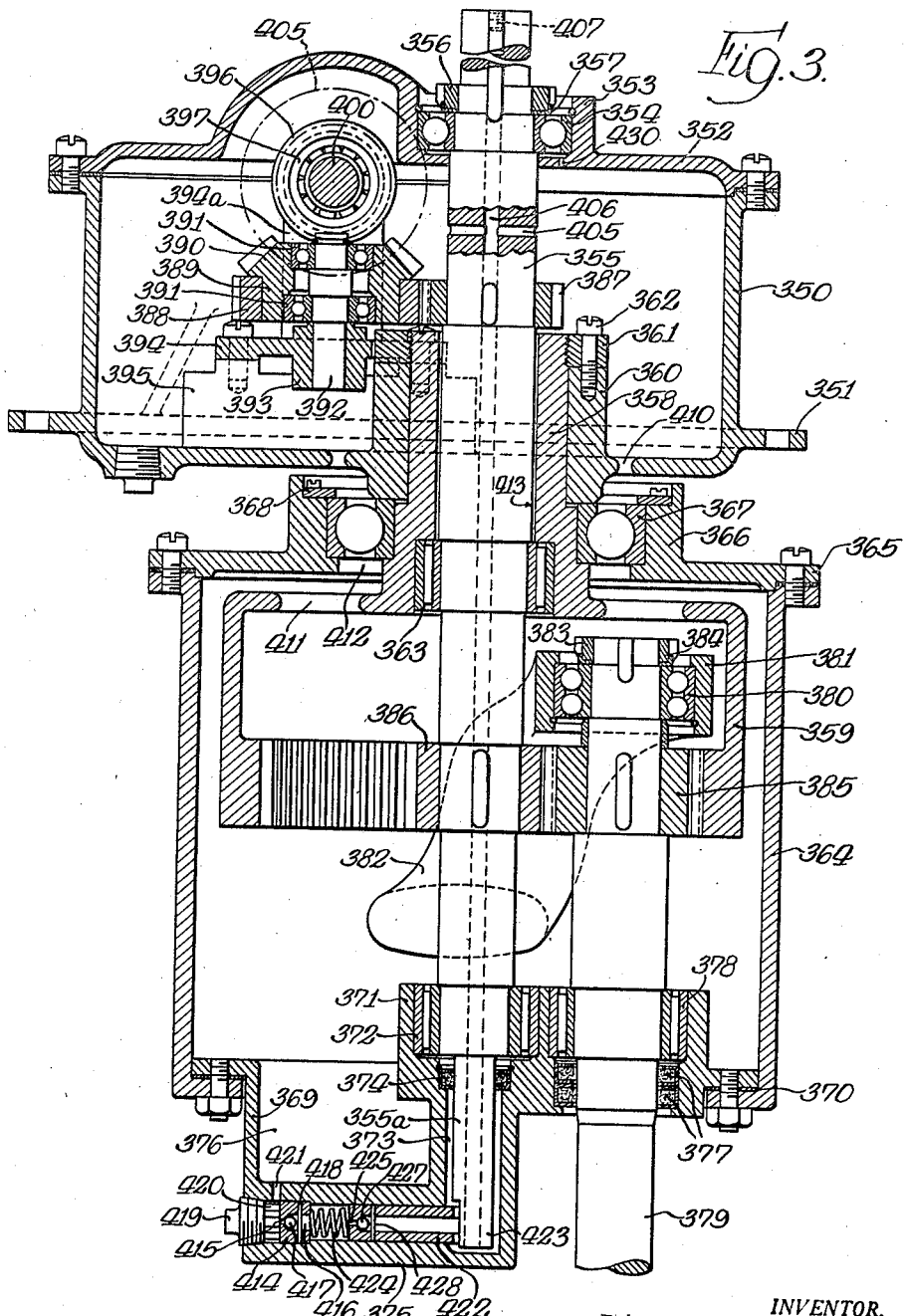

Patented Nov. 23, 1943

2,334,775

UNITED STATES PATENT OFFICE 2,334,775

TRANSMISSION UNIT

Edward J. Karp, Cicero, Ill., assignor to G. S. Blakeslee & Co., Cicero, Ill., a corporation of Illinois Original application April 25, 1941, Serial No. 390,229. Divided and this application July 23, 1942, Serial No. 452,063

10 Claims. (Cl. 74—300)

This invention relates to power transmitting means, and has to do with transmission units useful for various purposes but particularly suitable for use in mixing machines employed in hotels, restaurants and other establishments for mixing and treating comestibles.

My invention is directed to a transmission unit comprising a drive shaft and a driven shaft, the latter being rotated about its own axis and revolved about an axis eccentric thereto, which unit is quiet in operation and is provided with force feed lubricating means assuring adequate lubrication of the moving parts. Further objects and advantages of my invention will appear from the detail description.

In the drawings:

Figure 1 is a central vertical sectional view of a transmission unit embodying my invention, certain parts being shown in elevation and certain other parts being broken away, taken substantially on line 1—1 of Figure 2, on an enlarged scale;

Figure 2 is a plan view, on a reduced scale, of the transmission unit of Figure 1; and Figure 3 is a view similar to Figure 1 of a modified form of transmission unit embodying my invention.

This application is a division of my copending application for Mixing machine, Serial No. 390,229, filed April 25, 1941, and the transmission units herein disclosed are particularly intended for use in that machine.

The transmission unit shown in Figures 1 and 2 is indicated generally by the reference number 33 and comprises a drive shaft 37, a driven shaft 38, an upper gear housing 34 having a base flange 35 for fixedly mounting in the mixing machine, and a lower gear housing 36. Drive shaft 37 of the transmission unit 33 passes through a seal ball bearing 128 suitably mounted in cover 129 of gear housing 34, secured to the latter by screws or in any other suitable manner. Shaft 37 is of stepped construction, as shown in Figure 1, and is mounted at its lower end in a ball bearing 130 within housing 34. The lower wall of housing 34 is thickened at one side of shaft 37, to provide a boss 131 through which extends a stepped sleeve 132 extending from an internal ring gear 133 disposed below housing 34, sleeve 132 being concentric with ring gear 133 and eccentric to the upper gear housing 34. Sleeve 132 is clamped to boss 131 by a nut 134 screwing on sleeve 132 and bearing against the upper face of boss 131, this nut being locked against rotation by a set screw 135. A key 136, inserted in a groove 137 in sleeve 132 and extending into a groove 138 in boss 131, effectively locks sleeve 132 against rotation in the boss. Sleeve 132 is thus effectively secured against rotation and against endwise movement, relative to the upper gear housing 34.

A stepped tubular countershaft 140 is rotatably mounted in sleeve 132 in spaced relation thereto, by means of upper and lower needle bearings 141 of known type appropriately mounted in the upper and the lower ends of the sleeve, this countershaft 140 extending upward and downward beyond sleeve 132 into housing 34 and internal ring gear 133, respectively. The space between countershaft 140 and sleeve 132 provides an annular oil passage 142 opening at its lower end through the lower end of the sleeve and communicating, adjacent its upper end, with the interior of the upper gear housing 34 through an inclined duct or passage 143. A gear 144 is secured on the upper end of countershaft 140 and meshes with a pinion 145 secured on drive shaft 37, conveniently formed integrally therewith.

The lower gear housing 36 is provided with a removable cover 146, secured thereon by screws or in any other suitable manner, this cover having an upwardly extending concentric collar 147 within which is disposed a seal 148 providing an oil-tight closure about the lower portion of sleeve 132. Housing 36 is thus mounted for rotation on sleeve 132 and on the gear 133 enclosed thereby, the height of this ring gear preferably corresponding to the interior height of housing 36, which is thus confined by internal ring gear 133 against relative vertical movement.

The upper portion of shaft 38 is of stepped formation, as shown in Figure 1, the upper end of this shaft being mounted in ball bearings 150, suitably mounted in a collar 151 of an appropriately formed and disposed bracket 152 bolted to the bottom wall of housing 36. Bracket 152 is provided with a lower collar 153, which fits into the upper portion of a collar 154 extending downward from the bottom of gear housing 36, there being a ball bearing 155 mounted in collar 154, through which bearing shaft 38 extends to be rotatably supported thereby. A cup-shaped cap 156, provided with an outer circumferential flange 157, fits about shaft 38 and is suitably secured, conveniently by means of screws, to the lower end of collar 154. Cap 156 restrains ball bearing 155 against downward movement, upward movement of this bearing being prevented by collar 153, and an oil-tight seal about shaft 38 is provided by sealing members 158, of known type, disposed within cap 156. A gear 159 is secured on the upper end portion of shaft 38 and meshes with a pinion 160 secured on the lower end portion of countershaft 140. The hub of pinion 160 extends downward therebelow and is provided with a transverse slot 161 which is in register, at its inner end, with a transverse slot 162 extending through the wall of tubular countershaft 140 into the interior thereof. A screw rod 163 is suitably secured to cover 129 of gear housing 34, conveniently by means of a pin 164 secured through rod 163 at the under face of cover 129 and a nut 165 screwing on the upper end of rod 163 and bearing on the upper face of cover 129. Rod 163 passes downward through the open upper end of countershaft 140, and extends downward therethrough below the normal oil level in gear housing 36, preferably below slot 162. The normal oil level in the upper gear housing 34 and in the lower gear housing 36 is that indicated by the dot and dash lines, in each instance.

When the drive shaft 37 is rotated, the driven shaft 38 will be driven from shaft 37 at reduced speed, through the speed reducing gearing and the countershaft 140, as will be clear. Rotation of shaft 38, with accompanying rotation of gear 159, which meshes with internal ring gear 133 as well as with pinion 160, causes rotation of lower gear housing 36 about the axis of countershaft 140, so that shaft 38 is thus rotated about its own axis and is simultaneously revolved about the axis of countershaft 140, which is eccentric to shaft 37 disposed concentrically with the upper gear housing 34. During the rotation of countershaft 140, oil is raised from the lower gear housing 36, by the cooperation of screw rod 163 and the countershaft, this oil being discharged at the upper end of countershaft 140, above gear 144, and flowing downward over the latter gear and pinion 145 into housing 34, a portion of this oil flowing into the needle bearing 141 at the upper end of sleeve 132. The oil from housing 34 passes through duct 143 into the space or passage 142 between countershaft 140 and sleeve 132. A portion of this oil flows downward to and through the lower needle bearing 141 into lower housing 36, the balance flowing through a duct 133a onto the top of ring gear 133 and radially outward of the latter, due to centrifugal force, and thence downward between ring gear 133 and housing 36 into the lower portion of this housing. Preferably, the oil level in this lower housing 36 is maintained at about the height indicated, in order that the pinion 160 and the internal ring gear 133 and gear 159 may operate in oil, with a view to increased quietness in operation of the transmission unit. In the event the oil level in the lower housing 36 drops below the upper end of pinion 160, adequate lubrication of the gearing and associated parts will be assured so long as there is sufficient oil in housing 36 to provide for flow of oil through slots 161, 162 into countershaft 140, since the oil flowing from the lower end of sleeve 132 will suffice to lubricate adequately the gearing and associated bearings in the lower housing 36.

Preferably, I provide means whereby auxiliary attachments may be driven from shaft 37. A take-off shaft 168 is provided at the opposite side of shaft 37 from the countershaft 140, and is disposed perpendicular to shaft 37. At its inner end shaft 168 is rotatably mounted in a bushing 169 (Figure 2) secured by a set screw 170 in a collar 171 integrally connected to housing 34 by a neck 172. Collar 171 is aligned with a bearing sleeve 173 extending outward from housing 34, there being a bushing 174 secured in the inner end of sleeve 173 by a set screw 175, through which bushing shaft 168 is rotatably mounted, there being a stop collar 176 secured on shaft 168 in contact with the inner end of bushing 174. Sleeve 173 is of increased interior diameter at the outer end of bushing 174 and receives a seal 177 of known type providing an oil-tight closure about shaft 168. A worm wheel 178 is keyed on shaft 168 and confined between bushing 169 and a collar 179 secured on the shaft. A worm gear 180 is secured on shaft 37, below pinion 145, and meshes with worm wheel 178 for driving the latter and, therewith, the take-off shaft 168. Any suitable known means may be provided for connecting an attachment to take-off shaft 168 to be driven thereby.

The transmission unit shown in Figure 3 comprises an upper gear housing 350 provided, adjacent its lower end, with an outwardly extending flange 351 for bolting to a diaphragm plate or other suitable support within the head of the machine. The top of housing 350 is closed by a suitably formed cover 352 bolted or otherwise suitably secured thereto. This cover 352 is provided with an upwardly extending collar 353 within which is suitably mounted and confined a ball bearing 354 of known type. A drive shaft 355, of stepped formation, is rotatably mounted at its upper portion in collar 353, by means of the ball bearing 354, and extends upward a suitable distance above collar 353 for reception of a drive pulley keyed or otherwise suitably secured thereon. A nut 356 of known type, provided in its outer circumference with spaced slots extending in the direction of its axis, is threaded on shaft 355 and confined against turning thereon by a lock washer 357 confined between the nut and the top of the inner race of ball bearing 354, for restraining shaft 355 against endwise movement. Shaft 355 passes downward through a neck 358, of stepped formation, concentric with and extending upward from the top wall of a downwardly opening internal ring gear 359. Neck 358 extends upward beyond a collar 360, formed integrally with and extending upward from the bottom wall of gear housing 350, and is threaded at its upper portion for reception of a nut 361, screwed thereon and seating upon the upper end of collar 360. Nut 361 is locked against turning movement by a cap screw 362 passing therethrough and threading into collar 360. Neck 358 is appropriately recessed from its lower end for reception of an anti-friction roller bearing 363, of known type, suitably mounted therein in a known manner and rotatably supporting the adjacent portion of shaft 355.

The internal ring gear 359 is disposed within a lower gear housing 364 closed at its upper end by a cover 365 bolted or otherwise secured thereon. Cover 365 is provided with an integral upwardly extending concentric collar 366 appropriately recessed for reception of the outer race of a ball bearing 367, the inner race of which fits about the lower portion of neck 358 and is clamped between a shoulder thereon and the lower end of collar 360. In that manner the internal ring gear 359 is secured to the upper housing 350 and held against rotation relative thereto. A retaining ring 368 is secured in the upper end of collar 366, by cap screws or in any other suitable manner, and overlies the outer race of ball bearing 367, cooperating therewith for rotatably supporting lower housing 364 for rotation about neck 358 and confining it against relative downward movement.

The lower end of housing 364 is closed by a flanged member 369 bolted thereto with an intervening sealing gasket 370. Member 369 is provided, adjacent one side thereof, with an upwardly extending boss 371 suitably bored and recessed for reception of the lower portion of shaft 355 and a roller bearing 372 therefor of known type. The portion of boss 371 and member 369 below bearing 372 is bored to provide a vertical well 373 into which extends, in concentric spaced relation thereto, reduced lower end portion 355a of shaft 355. At the upper end of well 373 boss 371 is appropriately recessed for reception of sealing means 374 of known type, mounted therein in a suitable manner and providing an oil seal about reduced portion 355a of shaft 355. Well 373 opens, adjacent its lower end, into a horizontally disposed pump barrel 375 formed integrally with the lower wall of member 369, at the other side thereof from boss 371 and underlying an oil sump 376 formed as an integral part of member 369, for a purpose which will appear presently.

Boss 371 is further recessed for reception of sealing means 377 and a roller bearing 378, which rotatably support an attachment shaft 379 and provide an oil-tight seal thereabout. This shaft 379 is intended for reception of an attachment suitably secured thereto, in the same manner as shaft 38 of the form of transmission unit shown in Figure 1. Shaft 379 extends upward within gear housing 364 and is mounted at its upper end in a ball bearing 380 appropriately mounted and confined within a collar 381 provided at the upper end of a supporting arm 382. Arm 382 conveniently is formed integrally with housing 364, below internal ring gear 359, and extends therefrom inward and upward beneath and into ring gear 359, as shown. A nut 383 is screwed upon the upper end of shaft 379 and seats on a lock washer 384, which seats upon the inner race of ball bearing 380, cooperating with the latter ball bearing and with roller bearing 378 for confining shaft 379 against endwise movement.

A pinion 385, keyed on shaft 379, meshes with internal ring gear 359 and with a pinion 386 keyed on shaft 355. An upper pinion 387 is keyed on shaft 355, within gear housing 350 and adjacent the upper end of neck 358. Pinion 387 meshes with a spur gear 388 secured on hub 389 of a bevel gear 390 rotatably mounted, by means of ball bearings 391, on a stub shaft 392 of stepped formation secured in a collar 393 of a supporting plate 394. Plate 394 is bolted or otherwise suitably secured to two suitably formed bosses, one of which is shown and designated by the reference number 395, formed integrally with and extending upward from the bottom wall of gear housing 350. At one end plate 394 is provided with an upwardly extending arm 394a which carries at its upper end a bearing retaining ring 396 which receives a ball bearing 397 of known type. At its other end plate 394 is provided with a second upwardly extending arm (not shown) likewise provided with a retaining ring and a ball bearing aligned with ring 396 and ball bearing 397. A take-off shaft 400 is rotatably mounted in the aligned ball bearings and may be extended beyond the gear housing 350, with appropriate sealing means provided about the extended portion thereof and suitable provision for attachment of devices to be driven by shaft 400, in any suitable known manner. A bevel gear 405, indicated in dot and dash lines, is keyed on take-off shaft 400 and meshes with bevel gear 390, providing means for driving take-off shaft 400 from shaft 355.

Shaft 355 is tubular, being provided with an axial bore 406 closed at its upper end by a plug 407 and opening at its lower end through the lower end of shaft 355, which is spaced from the bottom of well 373, as shown. Shaft 355 is further provided with radial bores 405 opening therethrough from bore 406 above pinion 387. The bottom wall of gear housing 350 is provided with arcuate slots 410 therethrough overlying ball bearing 367, and the top wall of internal ring gear 359 is provided with radial slots 411 underlying ball bearing 367, cover 365 of the lower housing 364 being provided with an opening 412 concentric with sleeve 358 and extending outward beyond the inner face of the outer race of ball bearing 367. Shaft 355, at the portion thereof passing through sleeve 358, is of slightly less diameter than the interior diameter of the sleeve to provide a clearance space 413 between this shaft and the sleeve. The transmission unit is thus provided with passages for flow of oil from the upper gear housing to the lower gear housing, and means is provided for delivering oil from the lower housing to the upper housing, assuring adequate lubrication of the trains of gearing and associated elements.

Pump barrel 375 is of increased interior diameter at its outer portion for reception of a relatively thick disc 414 provided with an intake port 415, extending from its outer end and opening into a valve chamber 416 of increased diameter extending from the inner face of disc 414. A ball valve 417 is retained in chamber 416 by a pin 418 secured in disc 414, this valve seating outwardly at the inner end of chamber 416 for closing port 415, and opening inwardly for uncovering or opening this port. Disc 414 is held seated by a screw plug 419 threaded in the outer end of pump barrel 375 and provided, at its inner end, with a plurality of spaced studs 420 which contact the outer end of disc 414. Oil flows from sump 376 through a duct 421, in the upper portion of pump barrel 375 into the space between disc 414 and plug 419. A hollow piston 422, open at its inner end, is mounted for reciprocation in pump barrel 375, and is yieldingly held in contact with an eccentric element 423 at the lower end of shaft 355, by a coil compression spring 424 confined between the outer end of piston 422 and the inner face of disc 414. At its outer end piston 422 is provided with a port 425 controlled by an outwardly closing and inwardly opening ball valve 427 confined in the outer end portion of piston 422 by a pin 428 secured in the piston.

The amount of oil placed in the transmission unit is such that sump 376 is maintained filled with oil, or substantially so. When shaft 355 is driven, take-off shaft 400 is driven therefrom, as is the shaft 379, the latter shaft carrying with it the lower gear housing 364 about the axis of shaft 355. In the rotation of the latter shaft, the pump piston 422 is reciprocated by the eccentric element 423, thus delivering oil under pressure from pump 376 into well 373, this oil entering the lower end of bore 406 and passing upward therethrough to the radial bores 405 through which it is discharged above pinion 387, from which it is distributed to the upper gearing. A portion of the oil finds its way downward through clearance space 413 to and through roller bearing 363, thence flowing downward along shaft 355 to pinion 386 and thence downward to roller bearing 372, the excess flowing into sump 376. The remainder of the oil delivered into the upper gear housing 350 flows to the bottom thereof and thence through slots 410, ball bearing 387 and opening 412 into the lower gear housing 364. A certain amount of this oil is deposited upon the upper wall of internal ring gear 359 and is moved outward thereover by centrifugal force, being discharged downward at the periphery of this gear into the lower housing 364. A part of the oil passing through the openings 412 will pass through the slot 411 overlying the upper end of shaft 379 and will flow downward through ball bearing 380 to pinion 385, a portion of this oil flowing downward along shaft 379 into the roller bearing 378 for lubricating the latter. I thus provide means assuring adequate lubrication of all moving parts of the transmission unit during rotation of shaft 355 and revolution of lower gearing housing 364 about the axis of that shaft. Conveniently, though not necessarily, cover 352 of the upper gear housing 350 is provided with a restricted duct 430 therethrough, from beneath the roller bearing 354, for draining into upper gear housing 350 excess oil used in lubricating this roller bearing.

It will be understood, as above indicated, that various changes in construction and arrangement of parts of transmission units embodying my invention may be resorted to, without departing from the scope and field thereof, and I intend to include all such variations, as fall within the scope of the appended claims, in this application in which the preferred forms only of my invention have been disclosed.

I claim:

1. In a transmission unit, an upper gear housing, an internal ring gear fixed to said housing comprising an upwardly extending sleeve, a lower gear housing mounted on said ring gear for rotation thereabout and about said ring gear; a driven shaft rotatably mounted in said lower housing, a rotatably mounted tubular shaft extending into said upper housing and downward therefrom through said sleeve into said lower housing, gearing within said upper housing comprising a pinion secured on the upper portion of said tubular shaft, the latter having an outlet opening above said pinion, a lower pinion secured on said tubular shaft within said lower housing, a pinion secured on said driven shaft meshing with said lower pinion and with said ring gear, said unit having passages therein for flow of oil from said upper housing into said lower housing, and means for raising oil from the lower portion of said lower housing through said tubular shaft and discharging it therefrom through said outlet opening responsive to rotation of said tubular shaft.

2. In a transmission unit, an upper gear housing, an internal ring gear fixed to said housing comprising an upwardly extending sleeve, a lower gear housing mounted on said ring gear for rotation about the latter and said sleeve, a driven shaft rotatably mounted in said lower housing, a drive shaft rotatably mounted in said upper housing, a rotatably mounted countershaft extending into said upper housing and downward therefrom through said sleeve in spaced relation thereto into said lower housing, meshing pinion and gear members respectively secured on said drive and countershafts, a pinion secured on the lower end of said countershaft, a gear secured on the upper end of said driven shaft meshing with said latter pinion and said ring gear, the space between said sleeve and said countershaft communicating with said upper housing below said pinion and gear members for downward flow of oil from said upper housing through said space into said lower housing, and screw means cooperating with said countershaft and communicating with said lower housing adjacent the bottom thereof for raising oil from the lower housing and discharging it into said upper housing above said pinion and gear members.

3. In a transmission unit, an upper gear housing, an internal ring gear fixed to said housing having an upwardly extending sleeve, a lower gear housing mounted on said ring gear for rotation about the latter and said sleeve, a driven shaft rotatably mounted in said lower housing, a drive shaft rotatably mounted in said upper housing, a rotatably mounted countershaft extending into said upper housing and downward therefrom through said sleeve in spaced relation thereto into said lower housing, speed reducing driving connections between said drive shaft and said driven shaft and said lower housing comprising gearing adjacent the upper end of said countershaft and gearing adjacent the lower end thereof; the space between said sleeve and said countershaft communicating with said upper housing below said upper gearing, and screw means cooperating with said countershaft and communicating with said lower housing adjacent the bottom thereof for raising oil from the lower housing and discharging it into said upper housing above said upper gearing.

4. In a transmission unit, an upper gear housing, an internal ring gear fixed to said housing having an upwardly extending sleeve, a lower gear housing mounted on said ring gear for rotation about the latter and said sleeve, a driven shaft rotatably mounted in said lower housing, a drive shaft rotatably mounted in said upper housing, a rotatably mounted tubular countershaft open at its upper end extending into said upper housing and downward therefrom through said sleeve in spaced relation thereto into said lower housing, speed reducing driving connections between said drive shaft and said driven shaft and said lower housing comprising gearing adjacent the upper end of said countershaft and gearing adjacent the lower end thereof, the space between said sleeve and said countershaft communicating with said upper housing below said upper gearing and opening into said lower housing above said lower gearing, said countershaft opening adjacent its lower end into said lower housing below said lower gearing, and a screw rod within said countershaft cooperating therewith for raising oil from said lower housing and discharging it into said upper housing above said upper gearing.

5. In a transmission unit, an upper gear housing, an internal ring gear having a concentric sleeve extending upward into said upper housing fixedly secured thereto eccentrically thereof, a lower gear housing mounted on said sleeve for rotation thereabout and about said ring gear, a driven shaft rotatably mounted in said lower housing, a drive shaft rotatably mounted in said upper housing, a tubular countershaft open at its upper end rotatably mounted in said sleeve in spaced relation thereto extending therebeyond into said upper and lower housings, speed reducing driving connections between said drive shaft and said driven shaft and said lower housing comprising gearing adjacent the upper end of said countershaft and gearing adjacent the lower end thereof, the space between said sleeve and said countershaft opening into said upper housing below said upper gearing and into said lower housing above said lower gearing, said countershaft opening into said lower housing below said lower gearing, and a screw rod fixed to said upper housing extending downward through said countershaft and cooperating therewith for raising oil from said lower housing and discharging it through the upper end of said countershaft.

6. In a transmission unit, an upper gear housing, an internal ring gear fixed to said housing comprising an upwardly extending sleeve, a lower gear housing mounted on said sleeve for rotation thereabout and about said ring gear, a driven shaft rotatably mounted in said lower housing, a rotatably mounted tubular shaft extending into said upper housing and downward therefrom through said sleeve into said lower housing, gearing within said upper housing comprising a pinion secured on the upper portion of said tubular shaft, the latter having an outlet opening above said pinion, a lower pinion secured on said tubular shaft within said lower housing, a pinion secured on said driven shaft meshing with said lower pinion and with said ring gear, said unit having passages therein for flow of oil from said upper housing into said lower housing, the latter housing having in its lower portion an oil sump and a well, the lower portion of said tubular shaft extending into said well in communication therewith, means at the upper end of said well providing a seal about said tubular shaft, and an oil pump between said sump and well having its intake connected to said sump and its discharge connected to said well, said tubular shaft having an eccentric at its lower end and said pump comprising a piston yieldingly held in contact with said eccentric.

7. In a transmission unit, an upper gear housing, an internal ring gear fixed to said housing comprising an upwardly extending sleeve, a lower gear housing mounted on said sleeve for rotation thereabout and about said ring gear, a driven shaft rotatably mounted in said lower housing, a rotatably mounted tubular shaft extending into said upper housing and downward therefrom through said sleeve into said lower housing, gearing within said upper housing comprising a pinion secured on the upper portion of said tubular shaft, the latter having an outlet opening above said pinion, a lower pinion secured on said tubular shaft within said lower housing, a pinion secured on said driven shaft meshing with said lower pinion and with said ring gear, said unit having passages therein for flow of oil from said upper housing into said lower housing, the latter housing having in its lower portion an oil sump and a well with a pump barrel extending therebetween, the lower portion of said tubular shaft extending into said well in communication therewith, means at the upper end of said well providing a seal about said tubular shaft, means comprising an inwardly opening and outwardly closing valve providing an intake connection between said sump and said barrel, said tubular shaft having an eccentric at its lower end, a hollow piston reciprocating in said pump barrel having an intake port in its outer end controlled by an inwardly opening and outwardly closing valve and open at its inner end for discharge of oil, and means yieldingly holding the inner end of said piston in contact with said eccentric.

8. In a transmission unit, an upper gear housing, an internal ring gear having a concentric sleeve extending upward into said upper housing fixedly secured thereto eccentrically thereof, a lower gear housing mounted on said sleeve for rotation thereabout and about said ring gear, a driven shaft rotatably mounted in said lower housing, a drive shaft rotatably mounted in said upper housing eccentric to said sleeve, a rotatably mounted countershaft at one side of said drive shaft extending through said sleeve into said upper and lower housings, speed reducing driving connections between said drive shaft and said driven shaft and said lower housing through said countershaft, a take-off shaft rotatably mounted in said upper housing at the other side of said drive shaft perpendicular thereto, and driving connections between said drive and take-off shafts.

9. In a transmission unit, an upper gear housing, a lower gear housing, a drive shaft rotatably mounted in said upper housing, a countershaft rotatably mounted in said upper housing and extending therefrom into said lower housing, means supporting said lower housing for rotation about the axis of said countershaft, a driven shaft rotatably mounted in said lower housing eccentric to said countershaft, means for rotating said lower housing and said countershaft comprising a pinion secured on the upper portion of said countershaft, the latter having an oil outlet opening above said pinion and an oil passage leading to said opening, a lower pinion secured on said countershaft within said lower housing, a pinion secured on said driven shaft meshing with said lower pinion, said unit having passages therein for flow of oil from said upper housing into said lower housing, and pump means operated by said countershaft for raising oil from said lower housing through said passage of said countershaft and discharging it therefrom through said opening.

10. In a transmission unit, an upper gear housing, a lower gear housing, a shaft rotatably mounted in said upper housing and extending therefrom into said lower housing, means supporting said lower housing for rotation about the axis of said shaft, a driven shaft rotatably mounted in said lower housing eccentric to said first shaft, means for rotating said lower housing and said first shaft comprising gearing in said upper housing including a pinion secured on the upper portion of said first shaft, the latter having an oil outlet opening above said pinion and an oil passage leading to said opening, a lower pinion secured on said first shaft within said lower housing, a pinion secured on said driven shaft meshing with said lower pinion, said unit having passages therein for flow of oil from said upper housing into said lower housing, and pump means operated by said first shaft for raising oil from said lower housing through said passage of said first shaft and discharging it therefrom through said opening.

EDWARD J. KARP.